(12) United States Patent
Jerome

(10) Patent No.: US 6,177,887 B1
(45) Date of Patent: Jan. 23, 2001

(54) MULTI-PASSENGER VEHICLE CATERING AND ENTERTAINMENT SYSTEM

(76) Inventor: George A. Jerome, 7121 Royer Ave., West Hills, CA (US) 91307

( * ) Notice: Under 35 U.S.C. 154(b), the term of this patent shall be extended for 0 days.

(21) Appl. No.: 09/347,914

(22) Filed: Jul. 6, 1999

(51) Int. Cl.[7] .................................................. G08B 21/00
(52) U.S. Cl. .................. 340/945; 340/971; 340/825.35; 348/8; 455/6.3; 379/49; 379/171
(58) Field of Search .................................... 340/945, 971, 340/825.06, 825.08, 825.22, 825.35, 825.36; 379/49, 171; 348/8; 455/6.3

(56) References Cited

U.S. PATENT DOCUMENTS

| | | | |
|---|---|---|---|
| 4,774,514 | * 9/1988 | Hildebrandt et al. | 340/971 |
| 4,835,604 | 5/1989 | Kondo et al. | 348/8 |
| 4,866,515 | * 9/1989 | Tagawa et al. | 358/86 |
| 4,896,209 | * 1/1990 | Matsuzaki et al. | 358/86 |
| 4,975,696 | 12/1990 | Salter, Jr. et al. | 340/973 |
| 5,289,272 | 2/1994 | Rabowsky et al. | 348/8 |
| 5,311,302 | * 5/1994 | Berry et al. | 348/14 |
| 5,705,860 | 1/1998 | Ninh et al. | 307/91 |
| 5,808,661 | 9/1998 | Infiesto et al. | 348/14 |
| 5,835,127 | * 11/1998 | Booth et al. | 348/8 |
| 5,896,129 | 4/1999 | Murphy et al. | 345/327 |
| 5,959,596 | * 9/1999 | McCarten et al. | 345/2 |
| 6,034,688 | * 3/2000 | Greenwood et al. | 345/353 |
| 6,047,127 | * 4/2000 | McCarten et al. | 395/712 |
| 6,058,288 | * 5/2000 | Reed et al. | 455/6.3 |

* cited by examiner

Primary Examiner—Daniel J. Wu
Assistant Examiner—Toan Pham

(57) ABSTRACT

A method and apparatus for providing passenger selection of meals, beverages, entertainment, and amenity requests from a passenger seat. Additionally, it provides a method and apparatus for providing information to passengers relating to the aircraft flight and position, and information relating to passenger's connecting flights. Such requests and selections are transmitted to a central computer which maintains inventory, and prints passenger requests organized by seat location. The system supervises passenger games, such that a passenger may play a game against the computer, or any combination of passengers can elect to play among themselves. Additionally, while not in active use by a passenger, the system provides for the display of advertising materials on the passenger seat display. The seat portion of the system includes a food/convenience tray that locks in one of two positions, exposing either a flat surface for general use, or a "flip" side with the passenger control unit imbedded within.

16 Claims, 7 Drawing Sheets

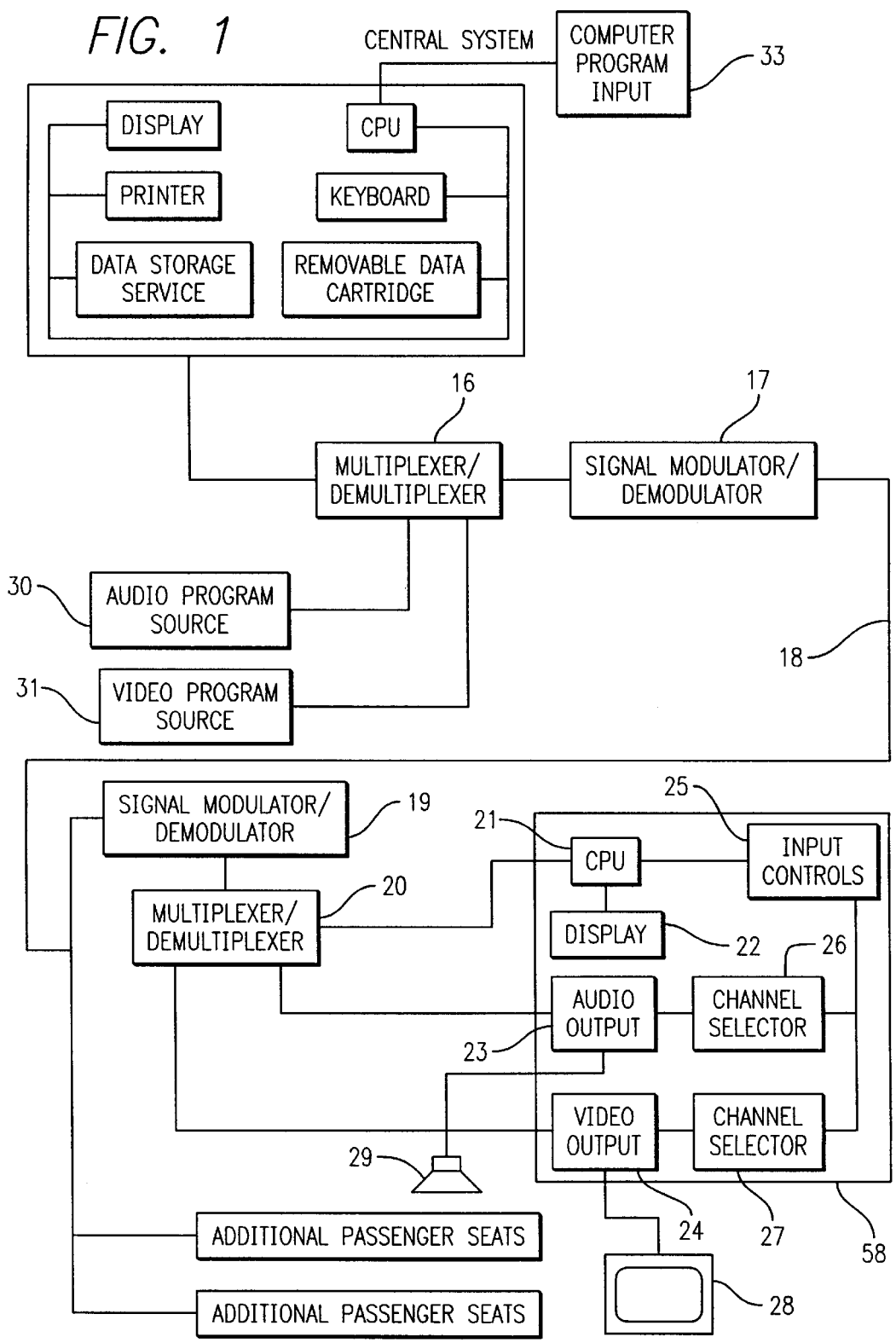

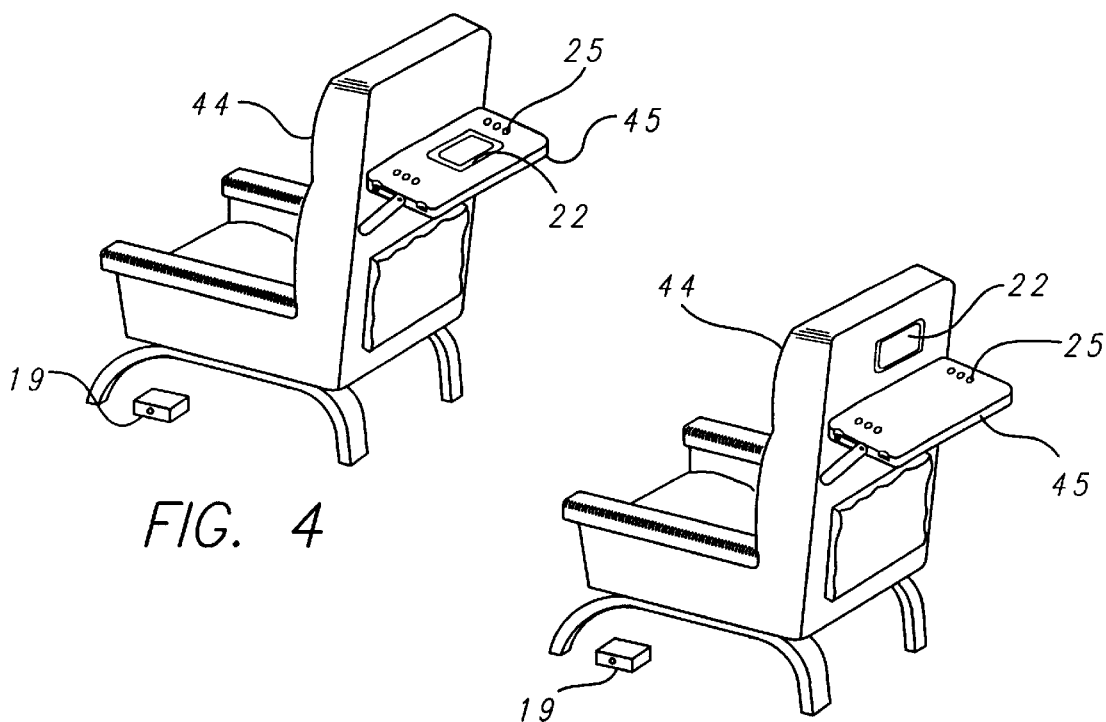
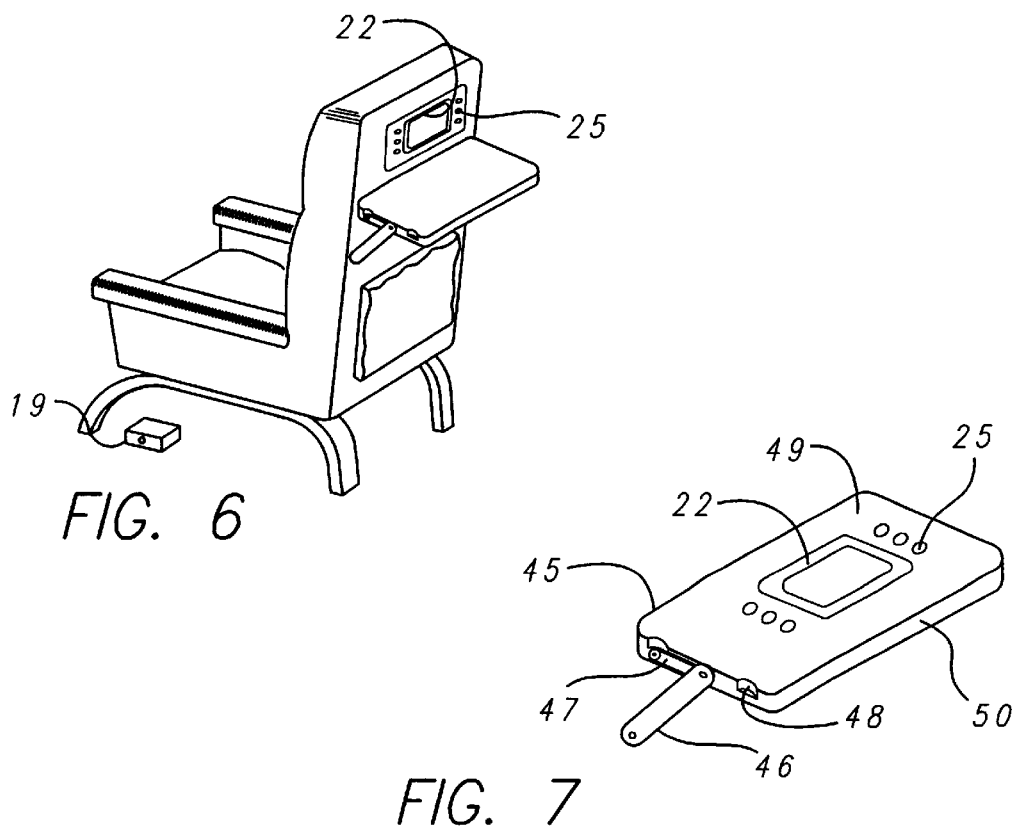

MULTI-PASSENGER VEHICLE CATERING AND ENTERTAINMENT SYSTEM

BACKGROUND

1. Field of the Invention

This invention relates to multi-passenger vehicle service systems for use in commercial aircraft, particularly to such a system for more efficiently enabling and processing passenger service requests for food, drink or entertainment.

2. Description of the Prior Art

The first commercial air transport vehicles to enter service were staffed with professional nurses to provide a level of care for the paying passengers. As air transportation gained both safety and a sense of routineness, the nurses were replaced with "stewardesses", or today, cabin attendants to provide certain services, such as beverages, meal service, and entertainment.

The prior art is replete with examples of means and devices to improve service. One can find over 600 patents relating to aircraft cabin systems intended for the comfort, ease, or service of passengers. Some of this prior art relates to food or beverage service, and some relates to various entertainment forms, including audio programs, television programs, games, or comfort items, such as reading lights, air outlets, and the like. Reading the prior art, one might conclude that the availability and delivery of service aboard multi-passenger vehicles is a highly perfected art. However this is far from the truth. In fact, despite the volume of prior art, the satisfaction with current levels of service aboard commercial aircraft is so low that cabin attendants receive training in the art of defusing or minimizing threats and actual acts of physical violence by passengers directed towards such attendants.

Numerous means and methods of delivering entertainment programs to each seat of a multi-passenger vehicle are known. Some transmit passenger wishes and wants to the cabin attendants with the goal of reducing work load. Other means are known to alert cabin attendants to a passenger need. Still other means and methods known deliver entertainment programs to each seat of a multi-passenger vehicle, with the passenger selecting the specific program desired.

Presently food and materials are made available for distribution to passengers based on general statistical analysis of past needs, but fail to account for unused materials, or materials lost or damaged through handling. For example, it has been a problem since the advent of liquor service on commercial air transportation to account for discrepancies between the beginning and ending inventory of bottles of alcohol. It is generally left to the word of cabin attendants to account for discrepancies between left-over inventory and any money collected for items.

It is a given in modem air travel that persons seated at the far rear of the coach cabin (or sometimes in the center if service is started from the front or rear) will sometimes be told that certain meal entrees are "out" with their choice restricted to a lesser selection than those people sitting in the front half of the cabin. This often leads to disagreeable confrontations between passenger and attendant, sometimes leading to physical attacks. U.S. Pat. No. 4,774,514 to Hildebrandt et al., Sep. 27, 1988, addresses the complexity of delivering different services to different classes of seats (coach, business, first, etc.), and the problems of altering the services when the class of seating arrangement is altered within the aircraft. While assisting in the re-configuration of an aircraft, this system does nothing to solve the service delivery aboard the aircraft during flight.

From U.S. Pat. No. 4,866,515 to Tagawa et al., Sep. 12, 1989, we learn of an entertainment system for transmitting video, audio, and game signals from a central location to each seat. As many as 30 patents address the function of providing multiple entertainment signals, such that each seat occupant can select from a variety of entertainment sources. All of these systems are variations on the theme of delivering multiple "programs" to passengers, but fail to alleviate the underlying problems inherent with delivering services aboard a confined aircraft.

U.S. Pat. No. 4,896,209 to Matsuzaki et al., Jan. 23, 1990, shows a polling system to provide cabin attendants with such information as status of seat belts, whether seats are upright, etc. The polling signal also provides information, such as which audio or video program each seat occupant is using. This system is a piecemeal solution to a complex situation.

U.S. Pat. No. 5,311,302 to Berry et al., May 10, 1994 shows a means of combining an interactive video monitor with a touch-sensitive screen to enable a passenger to interact with a video screen to order food, drinks, or items. Such technology is expensive, heavy, and easily prone to passenger abuse or damage.

U.S. Pat. No. 5,808,661 to Infiesto et al., Sep. 15, 1998 shows an audio/video intercom system which permits each passenger in a multi-passenger vehicle to communicate directly with a flight attendant. This system claims to eliminate one trip by a cabin attendant for each service request, but fails to address the possibility of a plurality of passengers desiring service at the same time, or numerous passengers desiring assistance at a commonly busy time such as immediately preceding meal service. This system invites the proverbial "busy signal" to be the only response to passengers during busy times.

U.S. Pat. No. 5,896,129 to Murphy et al., Apr. 20, 1999, addresses the needs of visually and/or hearing impaired passengers. This system provides sight-impaired passengers with Braille handsets and closed captioning for hearing impaired. While addressing the needs of special circumstance persons, this system does not improve the greater need of satisfying large numbers of people within the small confines of a vehicle.

U.S. Pat. No. 4,835,604 to Kondo et al., May 30, 1989, creates a variation of the now commonplace attendant call lights. The system anticipates the means by which an attendant can control individual seat request lights. The only benefit is the ability of an attendant to remotely turn off a call light, but the attendant would be required to be at the seat to receive a request, and then return to the seat to deliver the requested item.

U.S. Pat. No. 4,975,696 to Salter Jr., et al., Dec. 4, 1990, anticipates a desire to satisfy passenger queries for information about their flight, and provides the means by which flight information is presented to the passengers. This system creates a piecemeal approach to providing information, and obtaining information to a multiplicity of passengers.

U.S. Pat. No. 5,289,272 to Rabowsky et al., Feb. 22, 1994, shows a multi-signal, multiplexed video distribution system intended to deliver a multiplicity of programs to each seat of the vehicle. As with other similar systems, this system does not gather data from the passengers that would relieve attendant workload, assist in analysis of future service needs, or reduce potential problematic flight attendant—passenger confrontations.

Some prior art addresses special technical needs in order to provide data transmission aboard an aircraft containing numerous radio navigation devices. U.S. Pat. No. 5,705,860 to Ninh et al., Jan. 6, 1998, is such a case, dealing with the emission of EMI- and ESD-type radiation from high-speed data transmission devices. While this addresses a problem known to exist in the transmission of data within the confined space of an aircraft, it does nothing to solve service delivery problems associated with that data.

U.S. Pat. No. 5,835,127 to Booth et al., Nov. 10, 1998, shows an "Integrated electronic system utilizing a universal interface to support telephony and other communications services." This patent is particularly interesting because it seeks to offer a single, complete solution to the issue of multi-passenger vehicle service, but fails to achieve its apparent goals. Booth offers substantial comment about the disadvantageous result of failing to offer an "integrated electronic system that can be implemented in a piecemeal fashion to provide in-flight amenities without providing telephony or display services . . . " Booth then proceeds to show an integrated system that offers complex, and expensive-to-implement attachments to a complex system. Further, this system proceeds to utilize the rear of a seat to house portions of the system—an area already taken up with the flip-down food tray that cannot be removed without creating far greater problems than this system solves. Further, this system describes as a preferred embodiment, a hand-held control device, connected to the seat system by means of a cord. This control contains numerous buttons and controls. The fatal flaw arises from the fact that many people cannot master the art of programming a VCR, let alone master an unknown control box within the relatively short time comprising the duration of a flight. The frustration level achieved in implementing a system like this would far exceed the benefits. Additionally, the attachment cord becomes an inviting target for the frustrated. The cord is susceptible of being cut. The hand-held box could then be removed from the aircraft, disabling the system.

OBJECTS AND ADVANTAGES

Accordingly several objects of the present invention are to provide an improved system for integrating the delivery of information and the receipt of passenger requests.

This system provides a means to efficiently deliver various services and goods aboard an aircraft, or other multi-passenger vehicle during flight. It alleviates the underlying problems inherent with delivering such services.

This system delivers numerous types of information to passengers, eliminating the need for multiple systems. In so doing, it uses technology which is inexpensive, lightweight, and not easily prone to passenger abuse or damage. It specifically addresses the problem of a plurality of passengers desiring service at the same time, thereby eliminating work overload for cabin attendants.

This system improves the delivery of goods and services to a large number of people simultaneously, within the small confines of a vehicle. In so doing, it significantly reduces the need for cabin attendants to move about the cabin, reducing the risk of accident.

This system anticipates, and solves the problems, associated with the gathering data from the passengers within the same system as that designed to deliver entertainment and informational data to a multitude of passengers. It also addresses the problems of delivery of physical goods to passengers within the confines of a confined area.

The present system utilizes seat areas not previously encumbered with other parts or devices, and does not create an "attractive" nuisance that can be easily damaged by a belligerent or unhappy passenger.

An additional object is to deliver interactive entertainment, such as games to passengers, within a single duplex informational system, thereby alleviating boredom as a factor in long flights. Likewise, this system enables two passengers, in separate seats, electing to play against each other in competitive games. This particular advantage addresses the considerable problem of boredom of children during flights. By permitting any two seats, or any combination of seats, to play interactive games with each other, children, in particular, can entertain themselves without interfering with other passengers.

A further object is to assist, provide for, entertain, and inform passengers of a multi-passenger vehicle while at the same time reducing the work-load of cabin attendants, using a minimum of equipment.

BRIEF DESCRIPTION OF THE DRAWINGS

FIG. 1 A block diagram of the integrated system of the present invention.

FIG. 4 The flip-food tray passenger control unit.

FIG. 5 The second embodiment of the flip-tray passenger control unit.

FIG. 6 The third embodiment of the flip-tray passenger control unit.

FIG. 7 A perspective view of the tray locking scheme.

FIG. 10-1 and 10-2 A flow chart diagram of the software execution program.

REFERENCE NUMERALS

10 Central Computer
11 Central Computer Display
12 Central Printer
13 Central Computer Data Storage
14 Removable Storage Device
15 Central Computer Keyboard
16 Multiplexer/Demultiplexer
17 Signal Modulator/Demodulator
18 Interconnect Cable
19 Signal Modulator/Demodulator
20 Multiplexer/Demultiplexer
21 Seat Computer
22 Seat Data Formatter
23 Seat Audio Output
24 Seat Video Output
25 Seat Input Controls
26 Seat Audio Channel Selector
27 Seat Video Channel Selector
28 Seat Video Monitor
29 Seat Audio Speaker
30 Audio Program Source
31 Video Program Source
33 Computer Program Input
34 System Request Menu
35 Passenger View Screen Frame
36 "Select" Icon
37 Passenger View Screen Active Field
38 Menu Data
39 "Help" Icon
40 First-Tier Menu Items 41 Second-Tier Menu Items
42 Third-Tier Menu Items
43 Fourth-Tier Menu Items
44 Passenger Seat
45 Flip-Food-Tray
46 Tray Main Support Member
47 Tray Support Member
48 Tray Detent
49 Passenger Control Side of Tray
50 Utility Side of Tray
52 Galley Coffeemakers
53 Galley Cabinets
54 Galley Service Table
56 Galley
57 Central System
58 Individual Passenger Seat Station
60 Program Start
61 Input?
62 Data Type
63 Program Data
64 Request
65 Store in memory
66 Cabin Attendant Request
67 Passenger Request
68 Seat Download
69 Interrupt
70 Request Type
71 If Assistance
72 Output To Seats
73 Report
74 Inquiry
75 Sort Data
76 Display
77 If display Busy
78
79
80

SUMMARY OF THE INVENTION

This invention is an information accumulation, transmittal, delivery, presentation, and analysis system for providing service to passengers on a multi-passenger vehicle while at the same time reducing service attendant workload and possible confrontational situations that can arise between passengers and attendants. It includes a multiplicity of passenger control units, a way to multiplex numerous passenger requests on a single cable, a way to demultiplex and sort data received at a central location, a way to sort and print information to enable fulfillment of requests by attendants, and a way to store information for analysis at a later time. Additionally, this system provides unique features, such as a two way "flippable" food service tray, and seat-by-seat selection of contestants in interactive games.

Figures 1, 10:
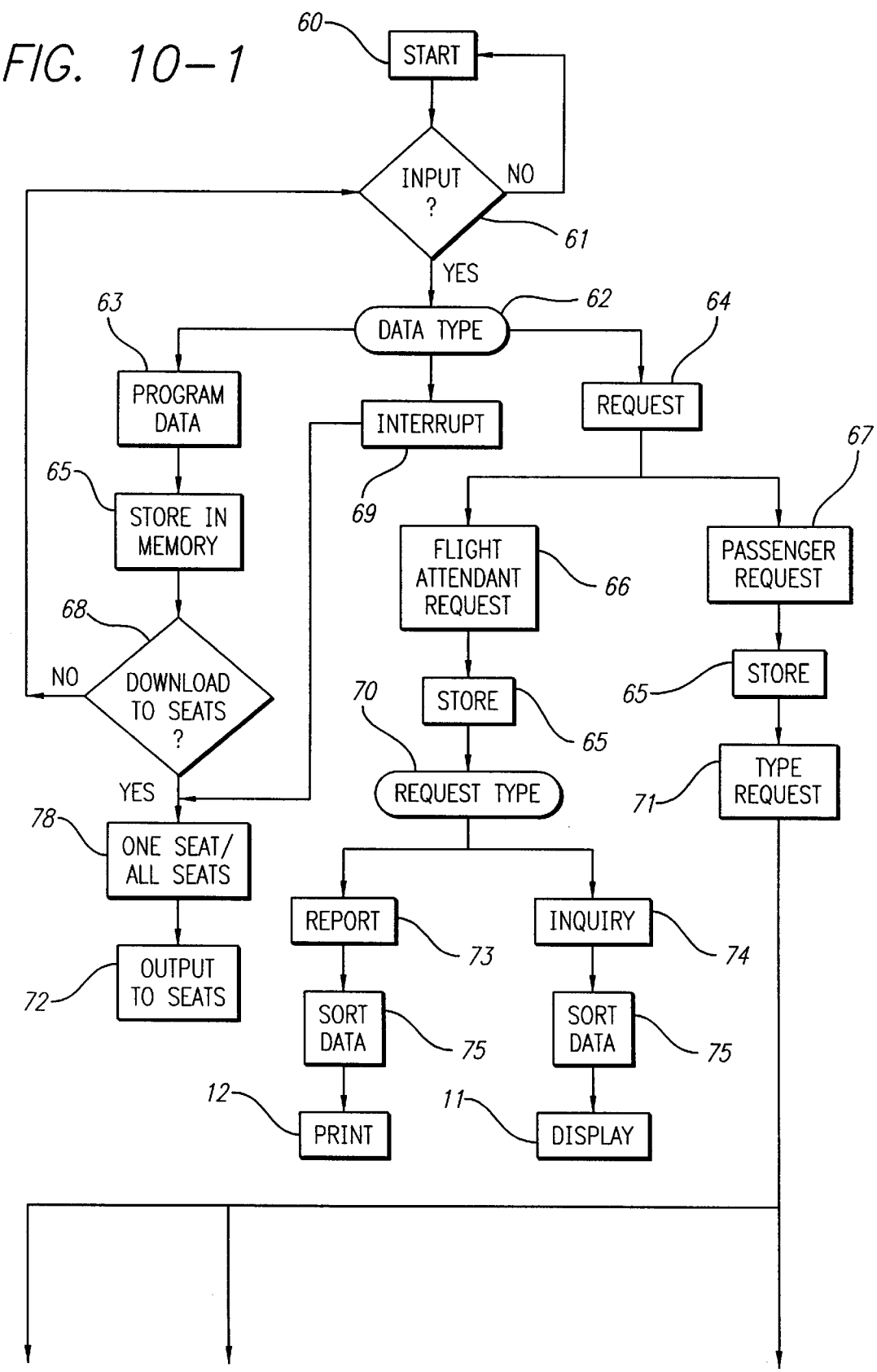
Figures 2, 10:
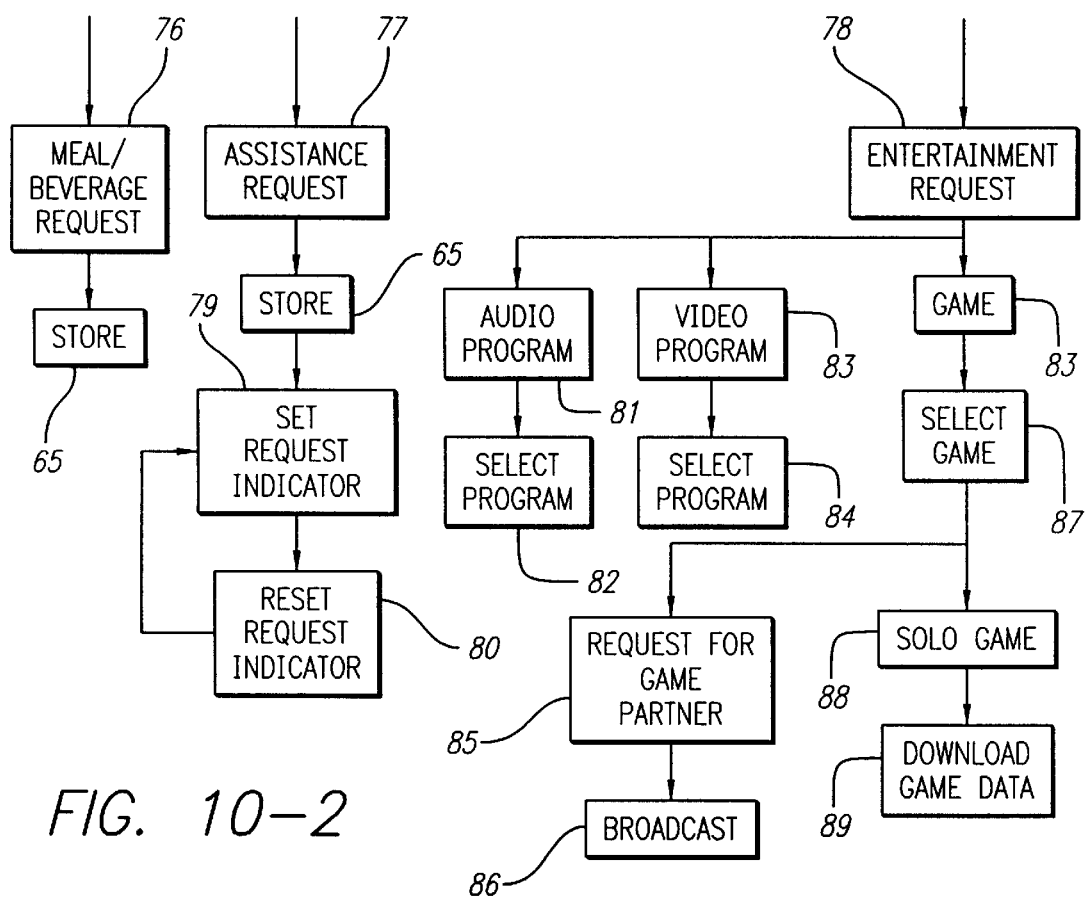

FIG. 1—Block Diagram of Integrated System—Description

A general system diagram of a multi-passenger vehicle catering and entertainment system is shown in FIG. 1. A centrally located computer 10 provides primary computing, data processing, data storage, and information presentation of this system. Display 11 alerts aircraft cabin attendants to out-of-the-ordinary situations or passenger requests. Printer 12 outputs data derived from passenger requests in a format providing easy understanding and use by cabin attendants. Data storage device 13 stores data for future use and computation. Removable data storage device 14 enables information to be removed and delivered to an off-aircraft central location for information analysis.

Interconnect cable 18 carries a full duplex high frequency signal from central system 57 to each individual passenger station 58. Interconnect cable 18 connects to modulator/demodulator 17 at the central system 57 side of the cable, and to modulator/demodulator 19 at each passenger station 58. Modulator/demodulator 17 feeds multiplexer/demultiplexer 16, which in turn connects central system 57, and each program source 30 and 31 to the system. On each passenger station side of interconnect cable 18, modulator/demodulator 19 connects to multiplexer/demultiplexer 20, which feeds signals to passenger computer 21.

A number of passenger seats contain a seat signal demodulator 19, each connected through modulator/demodulator 19 to interconnect cable 18. Demodulator 19 recovers data from a modulated carrier having a high frequency. Multiplexer/demultiplexer 20 separates digital data, audio information, and video programming information. Input control 25 enables channel selector 26 and/or 27 to separate a desired program channel from the multiplexed information separated out by multiplexer/demultiplexer 20. Audio output 23 delivers the selected audio channel to audio output device 23, while video output 24 delivers the desired video channel to monitor 28.

Digital information coming from multiplexer/demultiplexer 20 is passed to computer 21. Computer 21 also receives input commands from input controls 25. Data formatter 22 receives data from computer 21 and formats it for presentation on passenger view screen 35.

Audio output device 23, receiving information from demodulator 19 and channel selector 26, selects the appropriate channel and delivers same to audio output speaker 29. Video output device 24, receiving information from demodulator 19 and channel selector 27, selects the appropriate channel and delivers same to video monitor 28.

FIG. 1—Block Diagram of Integrated System—Operation

The system described is generally initiated by entry of information at several points. Audio programming information is loaded through audio program source 30. Audio source 30 may be a CD-ROM, an audio cassette player, or other type of audio storage system. Video programming information is loaded through video program source 31. Video program source 31 may be a CD-ROM, VHS cassette player, or other type of video analog or digital information storage system device. Audio program source 30 may be an audio cassette, CD-ROM, or other type of recorded audio information. This provides the audio and video program selections that will be available to the passengers during the operation of the system, or until new program source information is inputted. General computer programming, meal selections, special requests, flight information, gate information, and game selections are loaded through computer program source 32. After loading data into these three inputs, the system is prepared for operation.

Computer 10 constantly "polls" all seats on the system for inputs. Upon receipt of an input request, computer 10 takes appropriate action. A passenger initiates an action, or input, by means of input controls 25. Initially, data formatter 22 formats alphanumeric information, and passenger view screen 35 displays the first level of menu items for passenger selection. See FIG. 2 and 3 for further explanation of menu. These are typically "Meal", "Beverage", "Entertainment", "Assistance", and "Flight Information." A passenger may press an input control "Scroll Down" to see more menu selections, "Scroll Up" to see previous menu selections, or "Enter" if the select arrow (see FIG. 3) is on the same line as a desired menu item.

If a passenger selects "Meal", the computer then presents a series of second-tier menu selections 41 based on the meal choices available, derived from the data loaded through computer program source 32 prior to the system being placed in use. The passenger selects one of the choices by pressing "Enter". Upon such selection, computer 21 generates an electrical signal containing data pertaining to the passenger seat number, and the meal selection. At the next poll request from computer 10, this data "packet" is sent from computer 21 to multiplexer/demultiplexer 20, to signal demodulator 19, to interconnect cable 18, to signal modulator 17, to multiplexer/demultiplexer 16, and finally to computer 10. Computer 10 stores this received data in a data array located on data storage device 13. When appropriate, a cabin attendant can enter a command by means of keyboard 15, requesting a printout on printer 12 of the meal and beverage requests for each seat on the aircraft or sections of the aircraft—as desired—for efficient meal and beverage handling.

Likewise, if a passenger selects "Beverage", the computer then presents a series of second-tier menu selections 41 based on the passenger's first-tier choice, and the data previously loaded through computer program source 32. The passenger selects one of the choices by pressing "Enter". Upon such selection, computer 21 generates an electrical signal containing data pertaining to the passenger's seat number and the meal selection. This data "packet" goes from computer 21 to multiplexer/demultiplexer 20, to signal demodulator 19, to interconnect cable 18, to signal modulator 17, to multiplexer/demultiplexer 16, and finally to computer 10. Computer 10 stores this received data in a data array on data storage device 13.

The previously mentioned printout, when requested by a cabin attendant, will now contain a report of each seat, the meal requested, and the beverage requested.

If so desired, when the initial data for the flight is entered into computer program source 32, data on passengers, empty seats, and special passenger requests may be entered at this time. When the meal-beverage orders are printed for the cabin attendants, special orders and empty seat information will be compiled with on-board requests, and printed, eliminating the need for attendants to ask such questions as "Is anyone sitting here?, or "Did you order a special meal?"

Computer 10 also stores the meal and beverage information in removable data cartridge 14. At the end of the flight, this cartridge may be removed from the aircraft for delivery to a central facility for inventory analysis. Such data creation and preservation provides an accurate means of determining the actual inventory of food and beverages used on the flight.

If a passenger elects, the menu may be scrolled to an item entitled "Entertainment." Under entertainment, the passenger has multiple options, among them "audio programs", "video programs", and "games." If "audio programs" is selected, a series of audio channel selections will be presented to the passenger, the specific programs being determined by the data loaded from audio program source 30, and computer program input 33. Likewise, if the passenger selects "video programs", and an individual TV monitor is available at the passenger's seat, a series of video channel selections will be presented to the passenger, the specific programs being determined by data loaded from video program source 30, and computer program input 33.

Upon selecting the menu item "games", the passenger is presented with a multitude of choices. See FIGS. 2 and 3 for details of the presentation of the menu. First, the passenger is presented with a sub-menu listing the games available on the system. The games available are established by the games loaded through computer program input 33.

After selecting the particular game desired, the passenger is then presented with a choice of playing the game individually, if appropriate for that game, playing against the computer, if appropriate, or finally selecting one or more other passengers (identified by seat number) to play against.

Additionally, a passenger may select to broadcast a request for another passenger with whom to play a game. This desire to play against another passenger is displayed on all other passenger screens who have also indicated an interest in playing a game. Any passenger may respond to a game request by pressing the "enter" button when the request is displayed on passenger viewing screen 35. By this means, two passengers who otherwise would not have any knowledge of each other have the opportunity to "meet" via the system for purposes of entertaining each other and playing a mutually selected game.

An additional selection for the passenger is "Flight Information." By selecting this choice, the passenger may access such information as progress of the current flight, estimated time of arrival, local time at destination, or connecting flight information, such as departure gate, time of departure, distance within the terminal from arriving gate, and departure gate, or other such information as will be helpful to the passenger.

For passengers needing assistance in understanding the operation of this system, a means of providing help is available. Again, referring to FIGS. 2 and 3, a passenger can select the right-most emblem on each line. That emblem will initiate a help sequence, selected by the passenger, in either screen-based assistance, or, if selected, an audio track that explains what the selected menu line means. For example, If a passenger selects the help on a line indicating a chicken meal, the screen ( or audio, whichever selected) will describe what is provided with that meal. If a game line is selected, the rules for playing the game are explained. If the line offering to broadcast the desire of the passenger to locate a play partner is selected, the procedure for making an announcement is explained.

During periods of non-use by any individual passenger, the system has capabilities to place advertisements on the viewing screen. Such advertisements remain on the screen, or rotate among several advertisements, until the user presses any button on the passenger control panel, whereby the passenger takes control of the display.

Data coming from computer 10 through cable 18 is demodulated or modulated through modulator/demodulator 19 to remove data from a carrier frequency, or modulate outgoing data with a carrier frequency. The stripped signal then passes to multiplexer/demultiplexer 20, which serves to separate digital, video, and audio portions of the composite signal. The low-frequency signals are then sent to the passenger control unit, comprising computer 21, data formatter 22, audio output 23, video output 24, channel selector 26, channel selector 27, passenger view screen 35, and input controls 25. Generally, these items are located in the same housing as passenger viewing screen 35. The passenger interacts with the system by using input controls 25 to select items from menu structure 34 to register a request through the system.

Figure 2:
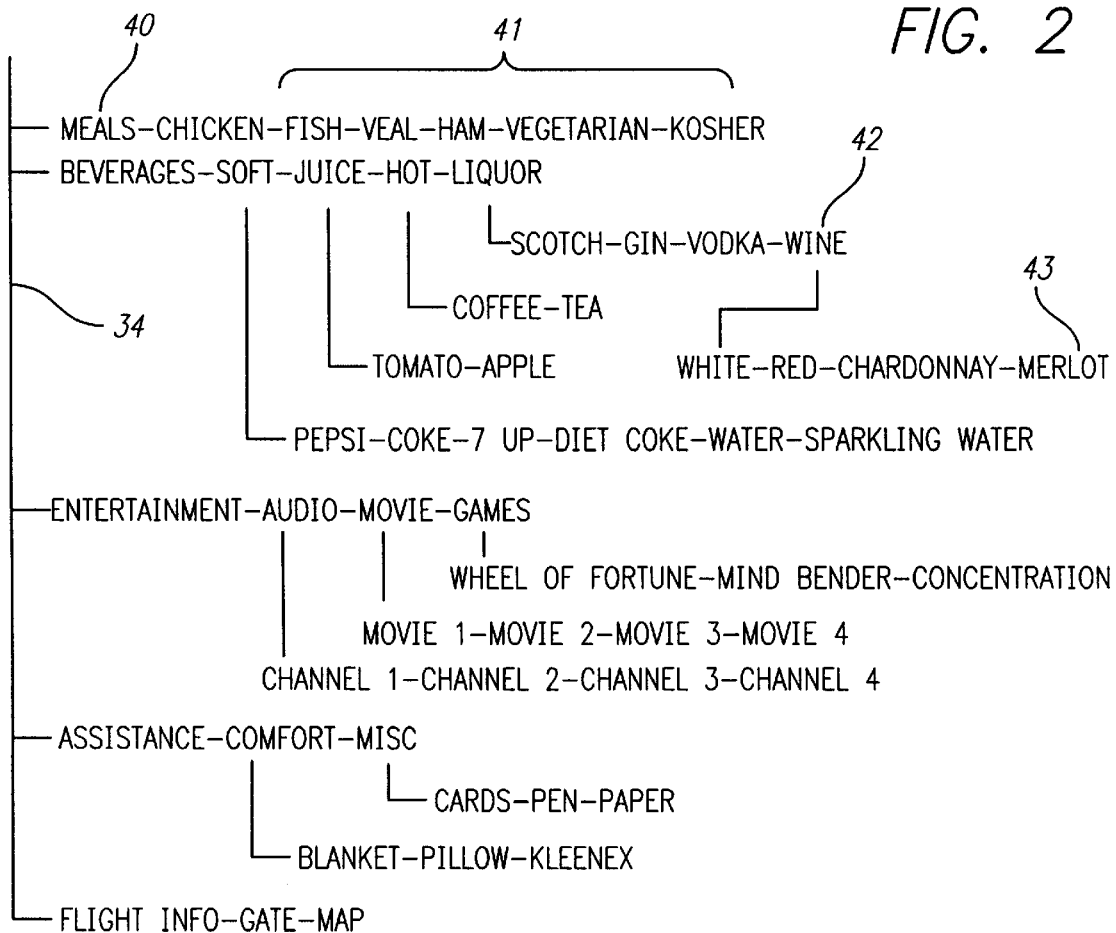
FIG. 2 A general block diagram of the system menu selection tree.

FIG. 2—General Block Diagram of Menu Selection Tree—Description

FIG. 2 generally shows the tree structure of the menu presented on passenger data formatter 22 as generated by CPU 21 and displayed on passenger view screen 35. First-tier menu items 40 represent the major categories of passenger benefits offered by this system. First-tier items 40 are meals, beverages, entertainment, assistance, and other broad categories of passenger areas of interest.

Upon selecting a first-tier item 40, the system then displays second-tier items 41 which are subcategories of first-tier items 40. A person versed in the art will understand that an almost infinite combination of possible menu items exist. If the passenger selects "beverages" as the first-tier choice, a list previously downloaded through computer program input 33 will appear. Having selected beverages, a typical second-tier menu 41 might be "soft drinks", "Juices", "Hot Beverages" and "Cocktails." Having selected one second-tier 41 item, the system presents appropriate third-tier items 42. By way of example, if second-tier item 41 "soft drinks" is selected, the appropriate third-tier list 42 may be "cola", "diet cola", and "water." By this means, the passenger is moved from a broad menu selection, to ever more specific choices until the single desired choice is reached and selected.

FIG. 2—General Block Diagram of Menu Selection Tree—Operation

Passenger view screen 35 initially shows first-tier menu items 40 of menu tree 34. The passenger may select one of these menu items by pressing icon 36 up or down until icon 36 points to the desired item. The passenger then presses the "Enter" button. Immediately upon this selection, the menu changes on passenger view screen 35 to show those items available as second-tier menu items 41 which are associated with selected first-tier item 40. In likewise fashion, the passenger may then select among second-tier items 41 by moving icon 36 up or down, and then pressing the "Enter" button.

By selecting a second-tier item 41, the passenger is offered the list of items, third-tier menu list 42, associated with the selected second-tier item 41, unless the previous menu list contained only one item. By selectively moving from first-tier menu 40, to second-tier menu 41, to third-tier menu 42 and fourth-tier menu 43, at one menu level, the passenger will be shown a single choice.

Having passed through the number of menu tiers necessary to reach a single choice, the passenger is presented with a confirming question, asking if the selected item is correctly identified. The passenger, again by using the scroll up and scroll down buttons, confirms the selection by moving icon 36 to either the "Yes" line, or canceling the request by moving icon 36 to the "No" line, and pressing enter. If the passenger selects "Yes" at this time, passenger computer 21 sends data to computer 10 containing the passenger seat number, and the passenger request. If the passenger selects "No", the system returns to the first-tier level menu, and the passenger may begin his request selection over.

As each menu item appears on passenger view screen 35, if help instructions are available for that item, right side icon 39 will be displayed. Icon 39 indicates that the pressing of the "help" button will provide either on-screen assistance in understanding what the menu item means, or how to access its functions. Additionally, if so desired, the passenger may listen to the help instructions with the assistance of a headset.

Figure 3:
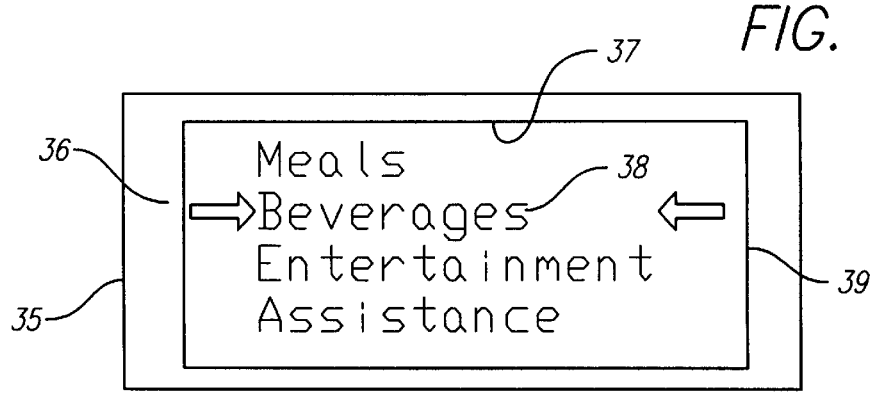
FIG. 3 The seat based passenger view screen.

FIG. 3—Seat Based Passenger View Screen—Description

FIG. 3 generally represents passenger viewing screen 35 (FIG. 1), which presents to the passenger the information compiled by passenger computer 21, formatted on data formatter 22, and displayed on passenger view screen 35. Passenger viewing screen 35 displays a portion, or all, of one level of menu 34.

Data formatter 22 sends alphanumeric data to passenger viewing screen 35. Such information is necessary to enable the passenger to interact with this system.

FIG. 3—Seat Based Passenger View Screen—Operation

After initiation of the system, by inputting computer program data through computer program input 33, audio program source 30, and video program source 31, a menu is presented visually to the passenger on passenger view screen 35. As described in the FIG. 2 operation description, passenger view screen 35 displays the current menu items and permits the passenger to make a selection among the displayed choices.

FIG. 4—Flip-Food-Tray Passenger Control Unit—Description

FIG. 4 shows the preferred embodiment of the passenger-seat-based portion of this system. The flip-food-tray 45 is a tray which can be brought into one of three positions rather than the conventional tray which has two positions—either stowed against the rear of the seat directly in front of the passenger, or approximately parallel to the passengers knees for use as a food or utility tray. The passenger control side 49 of flip-food-tray 45 is generally stowed against the rear of passenger seat 44 when not in use by the passenger. This protects the system components, and does not intrude upon the space allotted for the passenger. When desired for use, flip-food-tray 45 can be unlatched from the stowed position, and brought to a knee-parallel position with passenger control side 49 facing up, or knee-parallel with utility side 50 facing up.

Attached to passenger seat 44 is signal modulator/demodulator 19 which connects to interconnect cable 18. Modulator/demodulator 19 connects to multiplexer/demultiplexer 20, which communicates with passenger viewing screen 35 and passenger controls 25.

Situated in front of the passenger, and made as an integral part of the otherwise standard food service tray, the passenger control unit provides the passenger with access to all of the functions and benefits of this system. As shown in FIG. 7, flip-food-tray 45 portion of this system utilizes an otherwise wasted space of one side of the food tray. The conventional tray has a blank side which generally faces the passenger while the tray is in the "upright and locked" position. The other side of this tray is generally also flat, or nearly flat. When in the down position the tray presents an up-facing surface upon which the passenger may place food, utensils, or other implements. By locating the passenger control unit, or portions of the passenger control unit, on the side of the tray opposite that used for food, beverage, etc., the full benefits and functions of this system become available to the passenger in an otherwise crowded and cramped space.

FIG. 4—Flip-Food-Tray Passenger Control Unit—Operation

In the stowed position, flip-food-tray 45 is positioned against the rear vertical surface of passenger seat 44. In this position, it is essentially identical to a conventional service tray as used in current multi-passenger vehicles. When the passenger desires to use this system, tray support member 47 is released from tray detent 48, thereby permitting tray 45 to swing down and away from the rear of passenger seat 44. As tray 45 is released and moves away from the rear of passenger seat 44, the passenger has the option of flipping passenger control side of the tray 49 into the up position, to use the system, or the passenger may flip the utility side of the tray 50 into the up position, for use as a food or utility surface. Upon reaching the knee-parallel position, with either passenger control side 49, or utility side 50 in the up position, the passenger releases support member 46 and the tray is locked in the selected position. A person versed in the art is aware of the various ways ands means of achieving the locking mechanism comprising support member 46 and detent 48.

FIG. 5—Second Embodiment of Flip-Food-Tray Passenger Control Unit—Description

The second embodiment of flip-food-tray passenger control unit 45 re-positions portions of the passenger control unit onto the rear of the passenger seat 44. In this embodiment, passenger control unit viewing screen 35 is embedded in the seat in front of the passenger, with controls 25 mounted on food service tray 45, as shown in FIG. 5.

This second embodiment provides for a different ergonomic consideration of passenger comfort in viewing and using the system. In this second embodiment, controls 25 remain on food service tray 45.

FIG. 5—Second Embodiment of Flip Tray Passenger Control Unit—Operation

Functionally this embodiment operates identically to the embodiment of FIG. 4.

FIG. 6—Third Embodiment of Flip-Tray Passenger Control Unit—Description

The third embodiment of flip-tray passenger control unit 45 re-positions all of the passenger control unit, comprising the passenger seat CPU 21, data formatter 22, audio output 23, video output 24 channel selector 26, channel selector 27, passenger viewing screen 35, and passenger controls 25 onto the rear of the passenger seat 44. In this embodiment, all system controls are located in the rear of passenger seat 44, and flip-food-tray 45 can be conventional service tray.

FIG. 6—Third Embodiment of Flip Tray Passenger Control Unit—Operation

The functionality of this third embodiment is identical to the operation of the preferred embodiment as more fully described in the description of FIG. 4.

FIG. 7—Flip-Food Tray—Description

The flip-food-tray of FIG. 7 more fully shows the main tray support member 46, attached at one end to passenger seat 44, and the other end attached to flip-food-tray 45. Tray support member 47 is attached at one end both to main tray support member 46 and tray 45.

Passenger viewing screen 35 and /or passenger input controls 25 are mounted on moveable food tray 45. Flip-food-tray 45 is attached to bracket 46, which is connected to the seat directly in front of the passenger seat being described. A plurality of such trays, each mounted to a seat for use by the passenger directly behind the mounting seat, comprise the system of trays supporting a system of passenger control units. Bracket 46 is connected to support member 47. Support member 47 allows food tray 45 to lock in one of two positions. The passenger control unit can be mounted facing up, or the passenger control unit can be mounted facing down. Detent 48 provides a positive locking position for support member 47.

In this system, tray surface 49, containing either viewing screen 35, controls 25, or both viewing screen 35 and controls 25, are facing the next seat back when the tray is in the up, or locked position. When support bracket 47 is moved from its detent position, the passenger has two options regarding positioning tray 45. The passenger may select passenger control surface 49, containing the view screen 35 and controls 25 for the up horizontal position. The passenger may, in the alternative, select utility surface 50, comprising a substantially flat surface—the surface intended for eating, etc.—as the up and locked surface. After selecting the desired position to be up, passenger control surface 49 for purposes of utilizing one or more functions of this system, or utility surface 50 for purposes of eating, etc., support member 47 locks into detent 48.

FIG. 7—Two-Way Flippable Food Tray—Operation

Traditionally, the food, or utility tray available to each passenger of a multi-passenger aircraft connects to the seat immediately in front of each passenger—the exception being passengers seated in a bulkhead seat. Flip-food- 45 is normally either in the closed, or locked position, close against the seat back in front of the passenger. When desired for use, the conventional tray is moved down to an approximately horizontal position directly in front of the passenger. When locked in the up position, the side of flip-food-tray 45 facing the passenger is the same blank surface that a conventional tray would offer.

Upon desire of use, the passenger releases support member 47 from detent 48, thereby permitting flip-food-tray 45 to drop from its stowed position. The passenger elects to rotate the tray such that either passenger control surface 49 is in the up position, or utility surface 50 is in the up position. For either selection, when the flip-food-tray 45 is in an approximately horizontal position, release of support member 47 engages the appropriate detent, and the tray is locked in the desired position.

Figure 8:
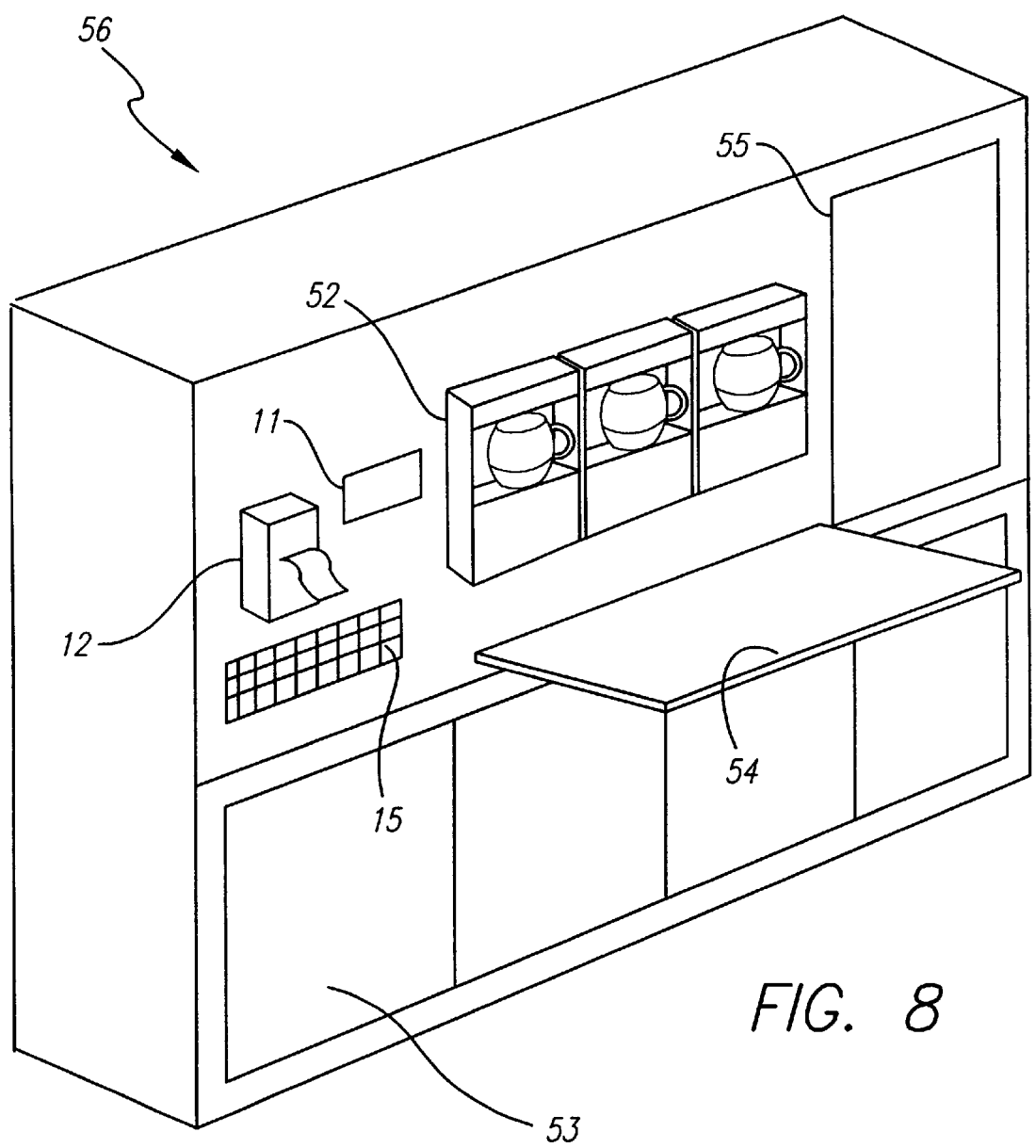
FIG. 8 A perspective view of galley, or central, portion of the system .

FIG. 8—Galley or Central Portion of System—Description

As shown in FIG. 8, galley 56 comprises a conventional galley, or food storage and preparation center, in any configuration used within the airline industry. Cabinets 53 and 55 are connected to galley 56. Coffeemakers 52 are connected to galley 56. A printer 12 is attached to galley 56. A keyboard, or data entry device 15 is connected to the galley in proximity to display 11.

Galleys for aircraft can be configured in a wide variety of shapes, sizes and configurations of available devices and capabilities. Mounted to galley 56 are the elements of the centrally located portion of this system; keyboard 15, display 11, and printer 12. Additionally, mounted within the galley, but not in view of persons in the galley area, are computer 10, data storage device 13, removable data cartridge 14, computer program input 33, audio source 30, and video program source 31.

FIG. 8—Galley, or Central Portion of This System—Operation

Keyboard 15 provides cabin attendants with the ability to access the functions of this system, while printer 12 and display 11 provide a summary of passenger requests to cabin attendants. Printer 12 will generally print passenger requests as they are received by the system. Meal requests are accumulated in data storage device 13. At an appropriate time, a cabin attendant requests through keyboard 15 a listing of all meal requests, or a printout of meal requests by cabin area or section. As meal requests are entered in data storage device 13, the data is also accumulated in data cartridge 14. Additionally, all requests for alcoholic beverages, as well as soft drinks, and juices are accumulated in removable cartridge 14. At the end to the flight, the removable cartridge is removed and used to transfer flight data, by any electronic means, to the airlines computer system. In so doing, exact information as to all meals served, all alcoholic beverages served, and all drinks served is stored in the airline computer for later analysis and comparison with physical inventories of good remaining after the flight.

Figure 9:
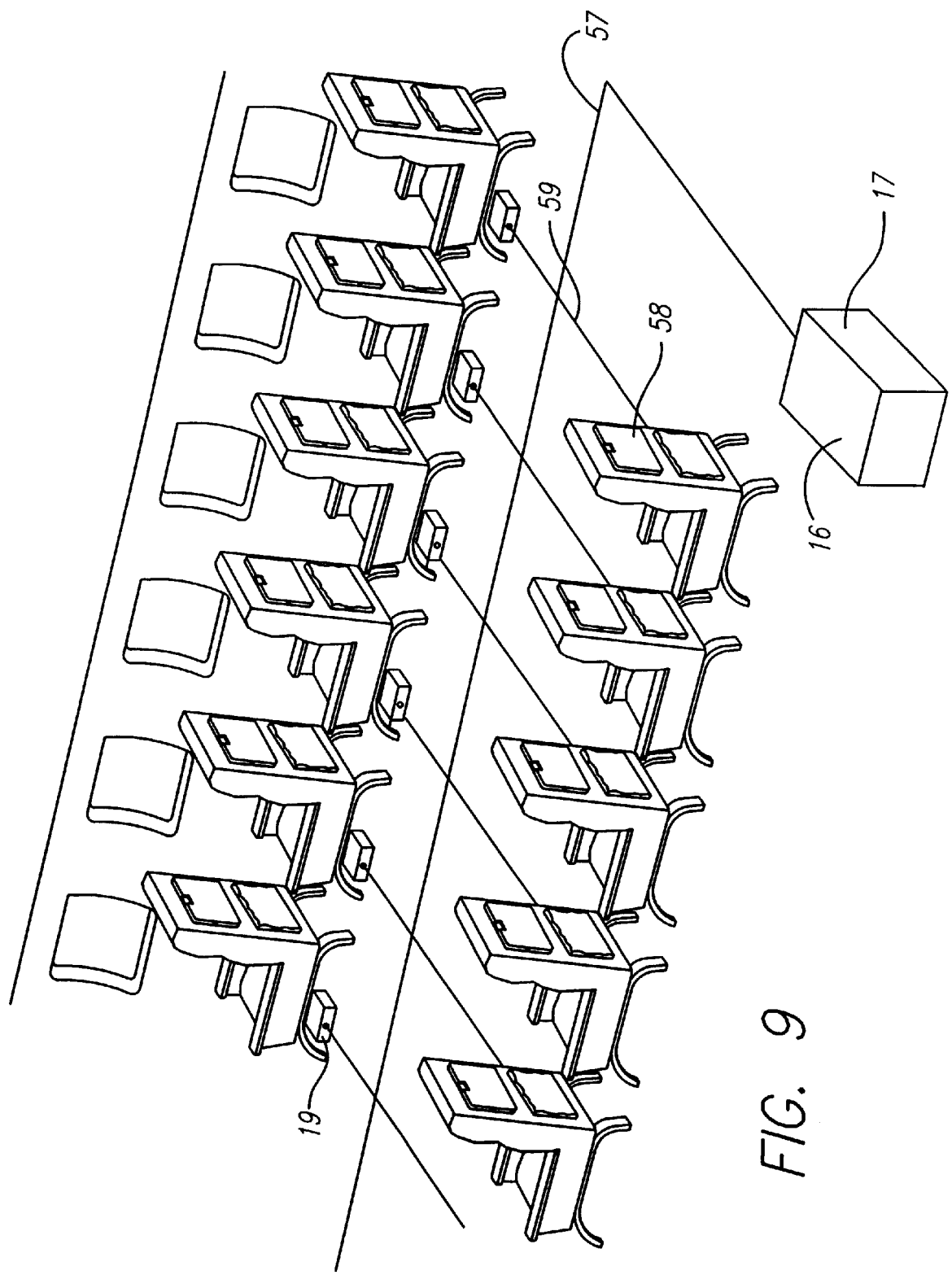
FIG. 9 A perspective view of interconnect cable system.

FIG. 9—Interconnect Cable—Description

Multiplexer/demultiplexer 16 connects to signal modulator/demodulator 17 which connects to interconnect cable 57. Interconnect cable 57 is of sufficient length to reach to or near to all seat rows within the aircraft. Adjacent each seat row, interconnect cable connects to cable splice 59. Cable splice 59 connects to individual row cables 58, of which there is one cable 58 for each side of each row of seats within the aircraft. The other end of each row cable 58 connects to at least one seat signal modulator/demodulator 19.

FIG. 9—Interconnect Cable—Operation

Data coming from, or to, computer 10 flows, as previously described, from computer 10 to multiplexer/demultiplexer 16, to signal modulator/demodulator 17, to row cable 58. from row cable 58, the signal flows to cable splice 59, then to interconnect cable 57. This path completes the flow of data from the computer 10 to one, or more, seat computers 21.

FIG. 10—Flowchart Diagram—Description and Operation

FIG. 10 is a flowchart diagram of the software showing execution of this program. Computer 10 operates under control of this program.

All functions of this system are initiated by start request block 60. The computer continuously monitors input block 61 for an input. Upon receipt of an input to block 61, coming from a passenger request, a cabin attendant request, or from program data entry, the program passes the input to data type block 62. The purpose of data type block 62 is to assign different levels of data security to inputs received at input block 61. Data security is used to prevent unauthorized modification of the program or stored data. The program then determines the type of input; program data block 63, or a request block 64. If the input is program data block 63, the incoming data is stored in memory block 65. Incoming program data block 63 may, or may not, trigger a download of data to each passenger computer 10, depending upon whether the downloaded data pertains to all passengers, or a single passenger. This decision is made by download block 68.

Having determined that a seat download is ordered, One Seat/All Seats block 78 evaluates the data to determine if the data is appropriate for all passenger computers, such as meal, or beverage selections, or if the data is specific to one or more passengers, such as special meal requests, or a private message intended for a specific passenger. If the download block 68 starts a download to all seat computers 10, download block 68 also activates an interrupt block 78, preventing passenger requests from interfering with the data download.

If data type block 62 receives data comprising a request, request block 64 determines if the request has been initiated by a cabin attendant, or a passenger request. This is important to the system for security reasons. Passenger request data is never allowed to alter or modify the system, or its memory. To permit such a system incursion would invite "hackers" to modify the performance or operation of the system.

Cabin attendant request block 66 receives all inputs from the galley, or central location computer 10, as sent by keyboard 15. All requests are stored block 65 in data storage device 13 for archival purposes, then analyzed by request type block 70. If the request is for a report 73, such as for a meal request compilation, or beverage request compilation, the appropriate data from memory storage 13 is sorted, and printed on printer 12. The cabin attendant may request to see any outstanding passenger assistance items, such as requests for pillows, blankets, etc. Such requests are evaluated by inquiry block 74, which initiates a data sort 75, then displays the open requests on display 11.

Passenger requests are also evaluated by request block 64. These inputs from passengers are handled with greater care, for security reasons, stored in data storage device 13, then further evaluated by type request block 71, to determine the required system action. Passengers requests for a meal or beverage are directed to meal/beverage request 76. This data is stored in data storage device 13 by store 65. No further action is taken with this information until a cabin attendant makes a system request, such as report 73.

A passenger requesting immediate assistance, such as for a blanket or pillow, makes the request through input control 25. This type of request is directed to assistance request block 77. This type of request necessitates an immediate, or near immediate action by a cabin attendant. As with all requests, data is stored in data storage device 13 by store block 65, then set request indicator 79 is set. Set request indicator displays a notice on display 11, and can sound an audible alarm if desired. By entry on keyboard 15, a cabin attendant can reset request indicator block 80, removing the notice from display 11. This action would normally be done after the cabin attendant has fulfilled the passenger request.

The third type of passenger request is entertainment request 78. Entertainment request block 78 sends the request to audio program 81, video program 83, or game 87, as appropriate. Requests for audio program 81 go to select program 82, which downloads the appropriate program from data storage device 13, and outputs the program to speaker 29, through passenger audio output 23. Similarly, requests for a video program are steered to video program 83, which goes to select program 84. Select program 84 directs the video stream to passenger monitor 28, through video output 24.

A passenger game request is more complex. If entertainment request 78 sees a game request, the request is steered to game 87. Game 87 sets up the passenger computer 21 for the game, and select game block 88 set s the specific game to be played. At the time the passenger makes the game request, the passenger also specifies whether to play the game solo, play the game with the computer as an opponent, or seek another passenger as an opponent.

If the passenger specifies a solo game, solo game block 89 sets the parameters for the passenger to play. If the game were normally played against at least one opponent, solo game block 89 will also set the computer as the other player. The passenger may select to play against another person. Request for game partner 85 first queries the passenger to determine if the passenger has a specific other passenger to play against, or wishes to broadcast by means of broadcast block 86 to all passengers to seek an opponent. After either the passenger specifies the other passenger, by seat number, or another passenger responds to the broadcast request, the game is initiated and played.

ADDITIONAL FEATURES AND FUNCTIONS OF SYSTEMS

Often, there is considerable confusion on a crowded flight, or a flight to a hub city, requiring passengers to move within the airport terminal to the proper gate for connecting flights. This system significantly alleviates this confusion. During the flight, data can be transmitted to the enroute aircraft pertaining to gate information for connecting flights. This data can be loaded into this system prior to departure, or updated in flight to accommodate gate changes that may occur during the duration of the flight. This information is then available to each passenger. By selecting a menu item entitled "Flight Information", the passenger may see up to data information, and even a map if so desired, of the necessary connecting flight's gate, and direction from the arriving gate of the current flight.

Prior to flight, data will be loaded through computer program input 33, FIG. 1 pertaining to the current flight, and all connecting flights for passengers. As the flight nears its destination, the flight attendant can draw to the attention of all passengers that connecting flight information pertinent to their trip can be obtained on the passenger control unit at their seat. Each passenger may then access the flight information of main menu 40. Those passengers seeking such information will then see their arriving gate, their connecting flight departure gate, and if appropriate, information telling them how to get from the arriving gate to their departing gate.

With this system, passengers may request in advance of the flight special meal needs. This information is also loaded into the system through computer program input 33. These special needs are integrated with all other passenger meal requests to derive the complete passenger meal request information which is used by flight attendants to deliver all passenger meals.

Often, the meal orders taken by the flight attendants as they move through the cabin exceed the available meals loaded aboard the flight. Typically, the passengers in the rear of the coach cabin are told that certain choices are no longer available. This can lead to an unpleasant encounter for the flight attendant, and even lead to violence. By having all passengers make their requests before delivery of any meals, shortages can be evaluated before hand. If necessary, a public address request can be made for people to voluntarily alter their choices. Generally, given such a request, enough people will agree to change their meal that any unpleasant encounters are avoided.

CONCLUSIONS, RAMIFICATIONS, AND SCOPE

Accordingly, it can be seen that the various embodiments as set forth here provide an apparatus which permits and assists passengers in making requests for food, beverages, entertainment and information directly from their seats with the information being made available to cabin attendants such that the request can be fulfilled quickly, efficiently, and with a minimum of cabin attendant time expenditure. The various embodiments of this system obviate the need for multiple systems and make available services and conveniences not previously possible. Additionally, the method and means of handling of passenger requests results in creation of a data base comprising a catalog of such requests, and usage of materials, food stuffs and beverages in complying with the requests.

Although the description above contains many specificities, these should not be construed as limiting the scope of the invention but as merely providing illustrations of some of the presently preferred embodiments. Various other embodiments and ramifications are possible within the scope of this device. For example, many variations within the teachings of this disclosure will produce various positions and locations for component parts of this system.

One of the ramifications of this system, for example, is the variation of information provided and stored in the data storage device, so as to provide various services and types of information to the passenger. The information provided through computer program input 33, audio program source 30, and video program source 31 can be varied so as to provide a virtually endless variety of services, entertainment and informative data available to the passenger.

Additionally, passenger viewing screen 35 (FIG. 1) may be located on the seat armrest, or available as a portable hand-held device. Other presentations may differ in format within the scope of the system. The system is useable on boats, buses, space vehicles, and other multi-passenger vehicles.

Accordingly, the scope of this invention should be defined by the scope of the following claims and their legal equivalents, and not by the specific embodiments described.

What is claimed is:

1. An integrated electronic information system for a vehicle having passengers in respective seats, comprising;
   (a) a central computer comprising a central processing unit, a display device, a data input device, a local data storage device, a removable data storage device, and a printer; and
   (b) a data transmission system comprising;
      (1) a multiplexer/demultiplexer connected to said computer, said multiplexer/demultiplexer capable of combining data signals from a central processing unit for transmission to other system parts, and capable of separating signals received from other system parts; and
      (2) a modulator/demodulator connected to said multiplexer/demultiplexer capable of encoding said data signals on a carrier and capable of recovering said data signals from said carrier; and
      (3) an interconnect cable comprising a primary cable and a system of interconnect cables connected to said modulator/demodulator and capable of transmitting electrical impulses or signals along its path; and
      (4) a modulator/demodulator connected to said interconnect cable capable of encoding said data signals on said carrier and capable of recovering said data signals from said carrier; and
      (5) at least one passenger-seat multiplexer/demultiplexer connected to said modulator/demodulator and capable of combining data signals for encoding on said modulator/demodulator, and capable of separating signals from said modulator/demodulator; and
   (c) at least one passenger seat computer connected to said passenger seat multiplexer/demultiplexer, said passenger seat computer comprising processing electronics, a display device, an input device or a plurality of input devices, and a local data storage device; and
   (d) an audio/video signal demodulator device connected to said passenger seat multiplexer/demultiplexer, and capable of discriminating between audio, video, and data signals from an output signal from said passenger seat multiplexer/demultiplexer; and
   (e) an audio listening device connected to said audio/video signal demodulator; and a video viewing device connected to said audio/video signal demodulator,
whereby said integrated electronic information system can gather information from a multitude of passengers without requiring time or effort from a cabin attendant, provide to passengers a multitude of information useful or necessary to the passenger without requiring cabin attendant involvement, and provide entertainment and diversion for passengers to relieve boredom and lessen possible confrontations between passengers and cabin attendants.

2. The integrated electronic information system of claim 1 wherein said passenger seat computer provides a visual display of a menu selection of a plurality of choices offered to said passenger.

3. The integrated electronic information system of claim 1 wherein said passenger seat computer provides a visual display of a menu selection selected from the class of beverages, entertainment selections, audio programs, video programs, assistance, airline flight information including connecting gate assignment information, display of real-time aircraft location, comfort, amenities, and information offered to said passenger.

4. The integrated electronic information system of claim 1 wherein said data storage device stores and organizes data, and said printer prints said data.

5. The integrated electronic information system of claim 1 wherein said passenger seat computer collects data representing passenger requests, meal requests, and beverage requests and transmits said data along said data transmission system, and said central processing unit compares said data to data representing the available inventory of a plurality of choices.

6. The integrated electronic information system of claim 1 wherein said input device enables the collection and use of said data representing a compilation of all passenger requests made during a flight.

7. The integrated electronic information system of claim 1 wherein said central computer enables any passenger to select from the group consisting of games and meal selection and beverage selection and flight information and arrival gate information and broadcasting a request to play a game with another passenger and a request for attendant assistance.

8. The integrated electronic information system of claim 1 wherein said central computer enables one passenger to announce his request for a partner to play a game to all other passengers.

9. The integrated electronic information system of claim 1 wherein said central computer enables the entry of data selected from the group consisting of occupied and unoccupied seats and special passenger orders requested and connecting flights and information pertaining to specific passengers and flight information and gate information and meal selections and beverage selections and video selections and audio selections and advertising information and game selections and assistance information.

10. The integrated electronic information system of claim 1 wherein said central computer enables input and recording of information relating to the inventory of goods received aboard the aircraft prior to flight.

11. The integrated electronic information system of claim 1 wherein said central computer enables input and recording of information relating to the inventory of goods used during the flight resulting from passenger requests, and deriving the inventory of goods remaining after such usage.

12. The integrated electronic information system of claim 1 wherein said passenger seat computer enables all passenger selection and information entry to be accomplished with a minimum of input controls, generally scroll up, scroll down, enter, and help.

13. The integrated electronic information system of claim 1 wherein said central computer enables the reception and recording of new system data, via radio transmission, of updated system information, for example changed connecting flight gate information.

14. The integrated electronic information system of claim 1 wherein said passenger seat computer enables the display of advertising information on said passenger display device.

15. The integrated electronic information system of claim 1 wherein said carrier contains a means selected from the group consisting of frequency modulation and amplitude modulation and spread spectrum modulation and light amplification through fiber optic cable.

16. The integrated electronic information system of claim 1 wherein said central computer enables services selected from the group consisting of meal selection without direct attendant/passenger contact and beverage selection without direct attendant/passenger contact and passenger assistance without direct attendant/passenger contact and game selection without direct attendant/passenger contact and flight information without direct attendant/passenger contact and gate information without direct attendant/passenger contact.

* * * * *